United States Patent [19]

Minagawa et al.

[11] E Re. 31,261

[45] Reissued May 31, 1983

[54] 2,2,6,6-TETRASUBSTITUTED-4-PIPERIDYL CARBOXY HETEROCYCLIC COMPOUNDS AS STABILIZERS FOR SYNTHETIC POLYMERS

[75] Inventors: Motonobu Minagawa, Kosigaya; Naohiro Kubota, Urawa; Toshihiro Shibata, Tsuji Urawa, all of Japan

[73] Assignee: Adeka Argus Chemical Co., Ltd., Urawa, Japan

[21] Appl. No.: 325,392

[22] Filed: Nov. 27, 1981

Related U.S. Patent Documents

Reissue of:

[64] Patent No.: 4,118,369
Issued: Oct. 3, 1978
Appl. No.: 709,561
Filed: Jul. 28, 1976

[51] Int. Cl.[3] ..... C08K 5/34; C07D 401/00; C07D 251/00

[52] U.S. Cl. ..... 524/100; 524/99; 524/101; 524/102; 544/222; 544/224; 544/242; 544/259

[58] Field of Search ..... 524/101, 100, 102, 99

[56] References Cited

U.S. PATENT DOCUMENTS

| | | | |
|---|---|---|---|
| 3,640,928 | 2/1972 | Murayama et al. | 260/45.8 N |
| 3,899,464 | 8/1975 | Murayama et al. | 260/45.8 N |
| 3,939,168 | 2/1976 | Cook | 260/45.8 N |

*Primary Examiner*—V. P. Hoke

[57] ABSTRACT

2,2,6,6-Tetrasubstituted-4-piperidyl carboxy heterocyclic compounds are provided which are useful as stabilizers for organic polymeric materials.

31 Claims, No Drawings

2,2,6,6-TETRASUBSTITUTED-4-PIPERIDYL CARBOXY HETEROCYCLIC COMPOUNDS AS STABILIZERS FOR SYNTHETIC POLYMERS

Matter enclosed in heavy brackets [ ] appears in the original patent but forms no part of this reissue specification; matter printed in italics indicates the additions made by reissue.

Hindered 2,2,6,6-tetraalkyl-4-carboxylic acid ester piperidine compounds have been proposed by Murayama et al U.S. Pat. No. 3,640,928 patented Feb. 8, 1972 as light and heat stabilizers for synthetic polymers, such as polyolefins, polyvinyl chloride, polyvinylidene chloride, polyurethanes, and polyamides. These compounds have the general formula:

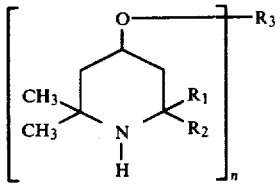

or a salt thereof.

In the above Formula:

$R_1$ and $R_2$ which may be the same or different, each are an alkyl group such as methyl, ethyl, isopropyl or dodecyl, or they form, together with the carbon atom to which they are attached, a saturated alicyclic group such as:

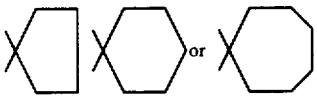

or a group of the formula

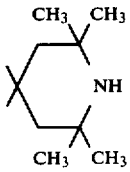

n is an integer of 1 to 3 inclusive; and $R_3$ is an acyl group.

These compounds have proved to be particularly acceptable because they do not impart a discoloration of their own to the synthetic polymer. The compounds generally employed previously have either been highly colored, such as the nickel compounds (which are normally green) and the 2-hydroxybenzophenones (which are varying shades and intensities of yellow). They also show very little tendency towards sublimation and exudation, and they have an excellent stabilizing action against both heat and light deterioration.

Consequently, the Murayama et al patent has been followed by a large number of patent and literature disclosures by Murayama et al and others of compounds including a 2,2,6,6-tetrasubstituted-4-piperidyl group attached to a base molecule of varying structures.

Murayama et al U.S. Pat. No. 3,898,303 patented Aug. 5, 1975 propose piperidino-spiro-hydantoin derivatives having the formula:

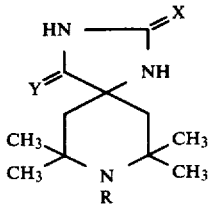

wherein

R represents an alkyl group, an alkenyl group, an alkenoyl group which may be substituted with an aryl group, a hydroxyalkyl group, an alkoxyalkyl group, an alkoxycarbonylalkyl group, an acyloxyalkyl group, a cyanoalkyl group or nitroso group, and X and Y individually represent oxygen atom or sulfur atom.

Murayama et al U.S. Pat. No. 3,899,464 patented Aug. 12, 1975 disclose a variation of the piperidino spiro compounds having the formula:

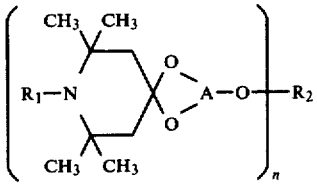

wherein $R_1$ represents hydrogen atom, an alkyl group, a substituted alkyl group, an alkenyl group, an alkynyl group, a substituted or unsubstituted aralkyl group, an aliphatic acyl group, an alkoxycarbonyl group or an aralkoxycarbonyl group, n is an integer of 1 to 4;

when n is 1, $R_2$ represents hydrogen atom, an aliphatic aromatic or heterocyclic monoacyl group, an alkyl group, an alkenyl group, an alkynyl group, an aralkyl group, an aryl group, an alkoxyalkyl group, an epoxyalkyl group, an alkoxysulfonylalkyl group, N-substituted carbamoyl group, a N-substituted thiocarbamoyl group, a monovalent group from an oxoacid or group

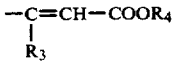

in which $R_3$ represents hydrogen atom, a lower alkyl group or phenyl group and $R_4$ represents an alkyl group;

When n is 2, $R_2$ represents carbonyl group, an aliphatic or aromatic diacyl group, an alkylene group, an alkenylene group, an alkynylene group, an aralkylene group, a N-substituted dicarbamoyl group or a divalent group from an oxoacid;

when n is 3, $R_2$ represents an aromatic triacyl group or a trivalent group from an oxoacid; and when n is 4, $R_2$ represents an aromatic tetraacyl group, and A represents a group

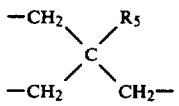

in which $R_5$ represents hydrogen atom or a lower alkyl group or, when n is 1, $R_5$ may represent together with $R_2$ a group

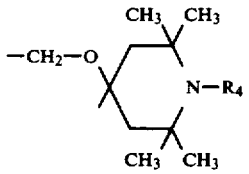

in which $R_6$ represents the same group as defined in $R_1$ and may be the same or different from $R_1$, or a group

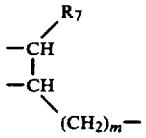

in which m is 1 or 2 and $R_7$ represents hydrogen atom or, when n and m are 1, $R_7$ represents methylene group together with $R_2$.

Murayama et al. U.S. Pat. No. 3,933,735 patented Jan. 20, 1976 propose 4-piperidone derivatives having a structure similar to the 4-piperidyl derivatives, but with a keto oxygen at the 4-position of the piperidine ring.

Murayama et al. U.S. Pat. No. 3,941,744 patented Mar. 2, 1976, disclose another variation of the piperidino spiro derivatives having the formula:

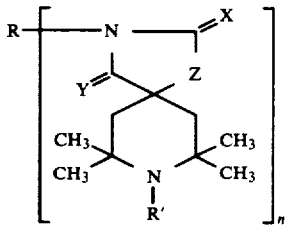

wherein

R' represents an alkyl group, a substituted alkyl group, an acyl group, an alkoxycarbonyl group, a substituted alkoxycarbonyl group, an amino group, a substituted amino group or nitroso group;

X represents oxygen atom or sulfur atom;

Y represents oxygen atom, sulfur atom or a group of the formula =N—R'' in which R'' is hydrogen atom, an alkyl group or a substituted alkyl group;

Z represents oxygen atom or a group of the formula <N—R''' is hydrogen atom, an alkyl group or a substituted alkyl group;

n is an integer of 1 through 4 inclusive; and

R represents, when n is 1, an alkyl group, a substituted alkyl group, an aryl group, a substituted aryl group, a cycloalkyl group, an alkoxycarbonyl group, a substituted alkoxycarbonyl group, a substituted phosphino group or a substituted phosphinyl group, when n is 2, an alkylene group, an alkenylene group, an arylene group, a substituted arylene group, an aralkylene group, an alkylenediphenylene group, a bis-(acyloxyalkylene) group, an alkylene-bis-(oxycarbonylalkyl) group, a dialkylene ether group or a diphenylene ether group, when n is 3, an alkanetriyl group, a tris(acyloxyalkylene) group, an alkane-tris-(oxycarbonylalkyl) group or a group of the group

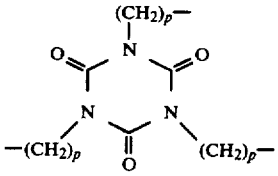

in which p is an integer of 1 through 8 inclusive, and when n is 4, an alkane tetrayl group, a tetrakis-(acyloxyalkylene) group or an alkanetetrakis-(oxycarbonylalkyl) group.

Murayama et al. U.S. Pat. No. 3,940,363 patented Feb. 24, 1976 disclose a further variation in which two 2,2,6,6-tetrasubstituted-4-piperidyl groups are linked together via the ring nitrogen atom to an R' alkylene linking group, which may be interrupted with an oxygen or sulfur atom, an alkenylene group, an alkynylene group, an aralkylene group, an aliphatic diacyl group, a group having the formula:

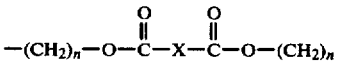

in which n is an integer of 1 or 2 and X is an alkylene group, or o-, m- or p-phenylene group or the carbon atoms of CO groups may be directly joined in the absence of X or a group of the formula:

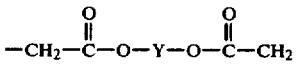

in which

Y is an alkylene group or o-, m- or p-phenylene group.

Ramey et al. U.S. Pat. Nos. 3,899,491, patented Aug. 12, 1975 and U.S. Pat. No. 3,920,659, patented Nov. 18, 1975, disclose alkyl alkanoate derivatives of substituted piperazines and substituted piperazinodiones. The substituted piperazines of U.S. Pat. No. 3,899,491 have the formula:

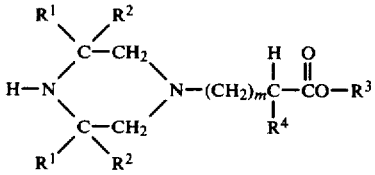

wherein $R^1$ and $R^2$ are methyl or together with the carbon to which they are bound form a mono-cyclic ring system having five or six carbon atoms;

$R_3$ is an alkyl group of from one to twenty atoms;

$R^4$ is hydrogen or methyl, and m is 0 or 1.

The substituted piperazinodiones of U.S. Pat. No. 3,920,659 have the formula:

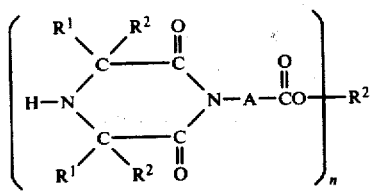

wherein $R^1$ and $R^2$ are independently of each other methyl or ethyl or together with the carbon to which they are bound form a cyclopentyl or cyclohexyl ring, which is unsubstituted or substituted with a methyl group;

n is an integer of from 1 to 2;

when n is 1, $R^3$ is an alkyl group of from one to twenty carbon atoms;

when n is 2, $R^3$ is an alkylene group of from two to eight carbon atoms; and

A is a straight or branched chain (lower) alkylene group containing from one to six carbon atoms with the limitation that the terminals of said alkylene group bear only hydrogen or one (lower) alkyl group.

Ramey et al. U.S. Pat. No. 3,920,661 patented Nov. 18, 1975 disclose dicarboxylic acids and salts in which one carboxylic acid group is esterified with a 2,2,6,6-tetrasubstituted-4-hydroxy piperidine and having the formula:

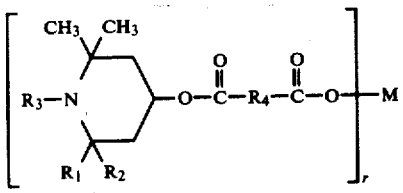

wherein $R_1$ and $R_2$ independently of each other are straight- or branched-chain alkyl having from one to six carbon atoms, or together with the carbon to which they are bound form a cyclopentyl or cyclohexyl ring, which is unsubstituted or substituted with a methyl group;

$R_3$ is hydrogen, alkyl having one to twelve carbon atoms, β-methoxyethyl, alkenyl having three or four carbon atoms, propargyl, benzyl or alkyl-substituted benzyl;

$R_4$ is straight or branched-chain alkylene having five to eight carbon atoms, or the group $[(CH_2)_mY(CH_2)_m]$ $(CH_2)_mY(CH_2)_n$ wherein Y is oxygen or sulfur and m and n independently of each other are an integer from 1 to 3;

M is hydrogen or a metal selected from the group consisting of barium, nickel, manganese, calcium, zinc, iron, sodium, cobalt, tin, and dialkyl tin, and z has a value of from 1 to 4, the value of z being the same as the available valence of M.

Ramey et al. U.S. Pat. No. 3,939,163 patented Feb. 17, 1976 disclose closely similar compounds in which $R_4$ is alkylene having from one to four carbon atoms.

Randell et al. U.S. Pat. No. 3,939,170 patented Feb. 17, 1976 disclose dehydropyridinyl sulphides, sulphoxides and sulphones having the formula:

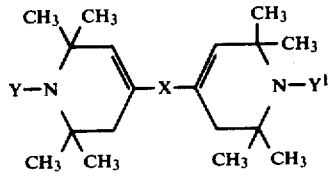

wherein

X is S, SO or $SO_2$ and Y and $Y^1$ are the same or different and each is H, OH, O- or a straight- or branched alkyl residue having from one to four carbon atoms, and salts thereof when Y and $Y^1$ are other than O-.

Randell et al. in published patent application No. B408,123 published Apr. 13, 1976 disclose substituted piperidine-4-ols having the formula:

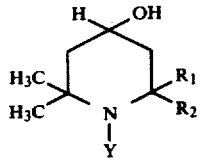

wherein $R_1$ and $R_2$ are the same or different and each is a straight- or branched alkyl residue having from one to twelve carbon atoms, or $R_1$ and $R_2$, together with the carbon atom to which they are attached, form a cycloalkyl residue having from five to twelve carbon atoms or the group:

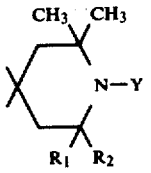

wherein $R_1$ and $R_2$ have their previous significance and Y is a straight- or branched alkyl residue having from one to twenty carbon atoms, an alkenyl or alkynyl residue having from three to twenty carbon atoms, an aralkyl residue having from seven to twelve carbon atoms or the group $—CH_2X$ wherein X is the group

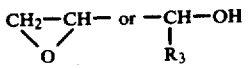

wherein $R_3$ is hydrogen, a methyl or phenyl residue, the group

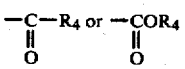

wherein $R_4$ is an alkyl residue having from one to twenty carbon atoms.

Cook U.S. Pat. No. 3,929,804 patented Dec. 30, 1975 discloses 4-piperidine acetamide compounds having the formula:

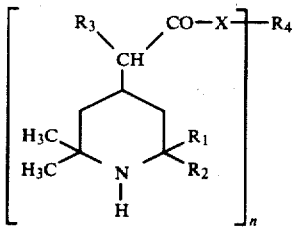

I wherein $R_1$ and $R_2$ are the same or different and each is a straight- or branched alkyl residue having from one to twelve carbon atoms, or $R_1$ and $R_3$, together with the carbon atom to which they are attached form a cycloalkyl group having from five to twelve carbon atoms;

$R_3$ is hydrogen, a straight- or branched alkyl residue having from one to four carbon atoms, an aralkyl residue having from seven to nine carbon atoms or a cycloalkyl group having from five or six carbon atoms;

$R_4$ is a metal ion or a hydrocarbyl residue having from two to twenty carbon atoms and being either unsubstituted or substituted by halogen or interrupted by one or more oxygen or sulphur atoms;

X is —O—, —S—, or $<NR_5$, wherein $R_5$ has the same significance as $R_3$; and n is 2, 3 or 4; as well as salts of the amine function of the compounds of formula I.

Cook U.S. Pat. No. 3,939,168 patented Feb. 17, 1976 discloses closely similar compounds having Y substituent on the piperidyl nitrogen atom, Y being alkyl, alkenyl, aralkyl or a group

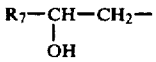

wherein $R_7$ is hydrogen, alkyl or phenyl.

In accordance with the instant invention, 2,2,6,6-tetrasubstituted-4-piperidyl carboxy heterocyclic compounds are provided having the formula:

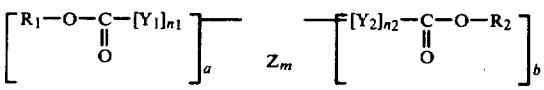

I $R_1$ is selected from the group consisting of

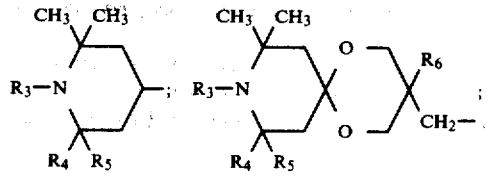

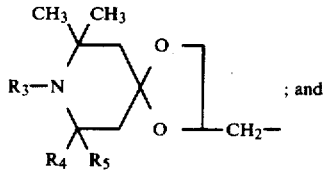

; and

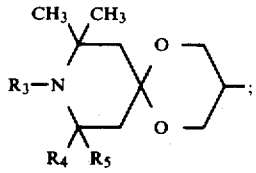

$R_2$ is selected from the group consisting of hydrogen; alkyl; alkenyl; alkynyl; aralkyl; aryl;

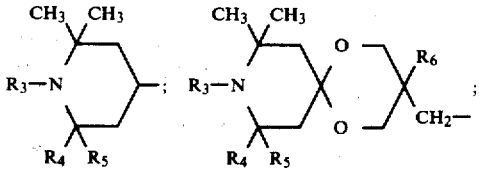

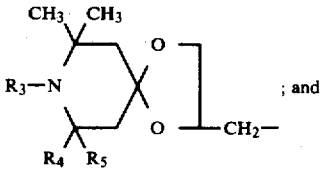

; and

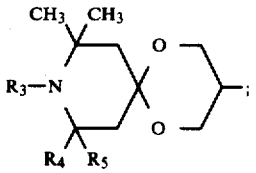

$R_3$ is selected from the group consisting of hydrogen; oxo; halogen; alkyl; alkenyl; alkynyl, aralkyl and aryl;

$R_4$ and $R_5$ are selected from the group consisting of alkyl and $R_4$ and $R_5$ taken together to form

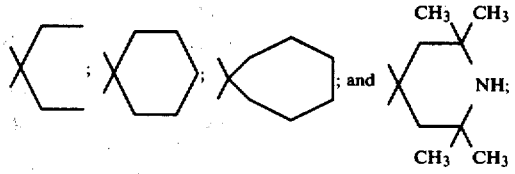

$R_6$ is lower alkyl;

a is selected from the group consisting of 1, 2 and 3;

b is selected from the group consisting of 0, 1 and 2;

Z is a nitrogen atom in a heterocyclic ring having from three to six ring atoms, *of which one to two are nitrogen,* any remaining ring atoms being carbon atoms;

m is selected from the group consisting of 1, 2 and 3;

$Y_1$ and $Y_2$ are bivalent linking groups selected from the group consisting of alkylene and alkyleneoxyarylene, the alkylene having from one to four carbon atoms; and $n_1$ and $n_2$ are 0 or 1.

When b=0, the compounds take the form:

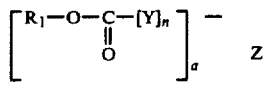

II where n is 0 or 1, and the other symbols are as defined in Formula I.

When b=1, the compounds take the form:

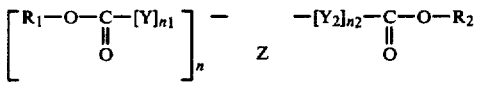

III

Other variations will be apparent, from consideration of Formula I.

The $R_2$, $R_3$, $R_4$, $R_5$ and $R_6$ alkyl have from one to about six carbon atoms. Exemplary are methyl, ethyl, n-propyl, isopropyl, n-butyl, isobutyl, tertiary butyl, secondary butyl, n-amyl, isoamyl, tertiary amyl, n-hexyl, isohexyl, secondary hexyl and tertiary hexyl.

The $R_2$ and $R_3$ alkenyl and alkynyl have from two to about six carbon atoms. Exemplary alkenyl include propenyl—and -2; butenyl-1, -2, -3 and -4; pentenyl—1, -2, -3, -4 and -5; and hexenyl—1,-2, -3, -4, -5 and -6.

Exemplary $R_2$ and $R_3$ alkynyl include propynyl—1 and -2; butynyl-1, -2, -3 and -4; amylynyl—1,-2, -3, -4, and -5; and hexynyl—1, -2, -3, -4, -5 and -6.

The $R_2$ and $R_3$ aryl have from six to fourteen carbon atoms and include phenyl, naphthyl and phenanthryl.

The $R_2$ and $R_3$ aralkyl have from seven to about 14 carbon atoms, and include phenmethyl, phenethyl, phenpropyl, phenbutyl and naphthethyl.

The heterocyclic rings have from three to six ring atoms of which from one to three are nitrogen, and the remainder, if any, are carbon, and include piperidine, piperazine, pyrrole, pyrazoline, pyrrollidine, melamine, isocyanuric acid, triazine, pyrazine, pyridone, pyridazine, [hexahydropipyrazine] *hexahydropiperazine*, pyrimidine, and hexahydropyrimidine.

The following compounds are exemplary:

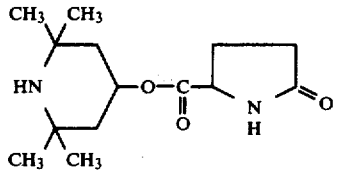

1

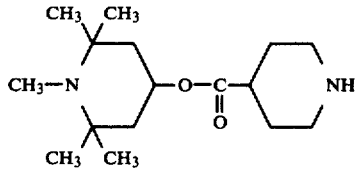

2

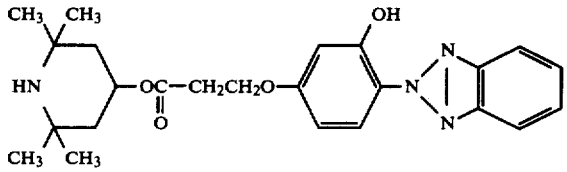

3

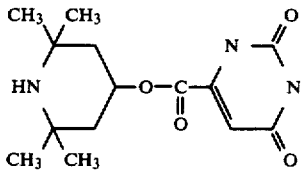

4

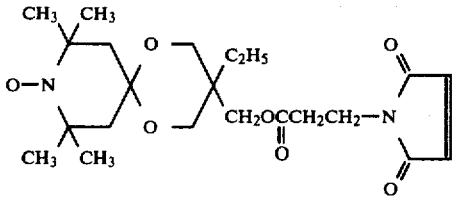

5

-continued
6
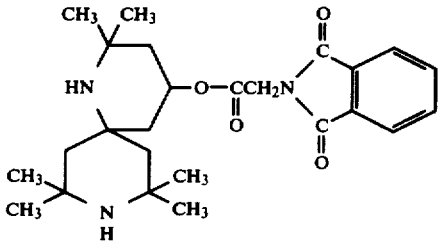
7
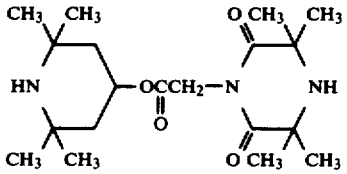
8
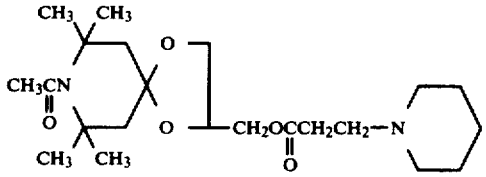
9
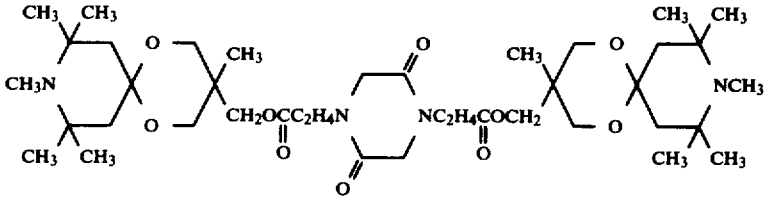
10
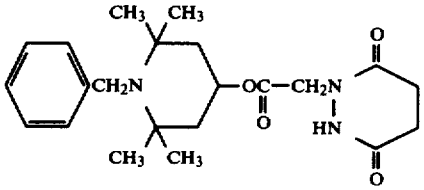
11
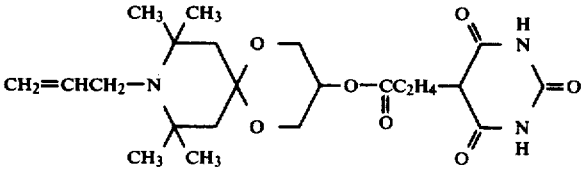
12
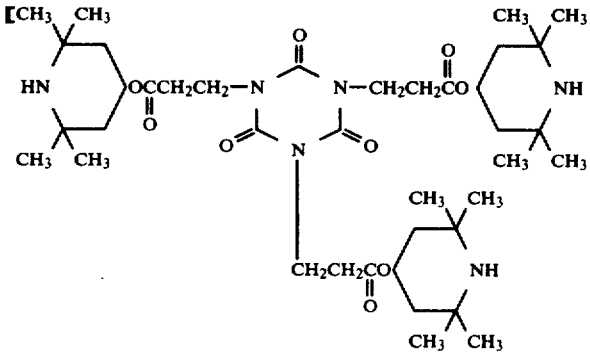
]

-continued
[ 13
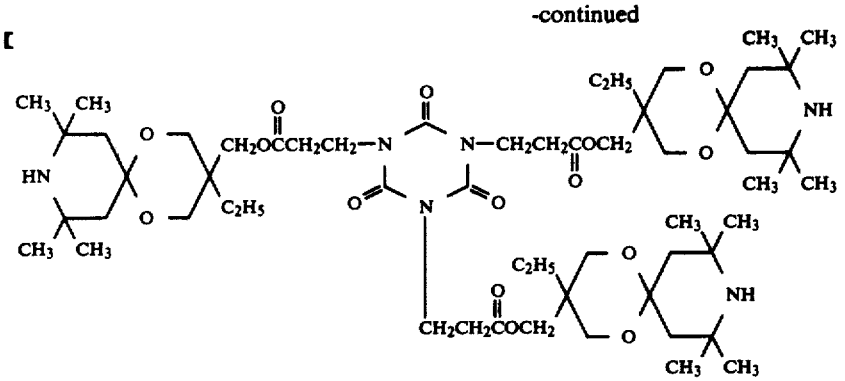
] 14
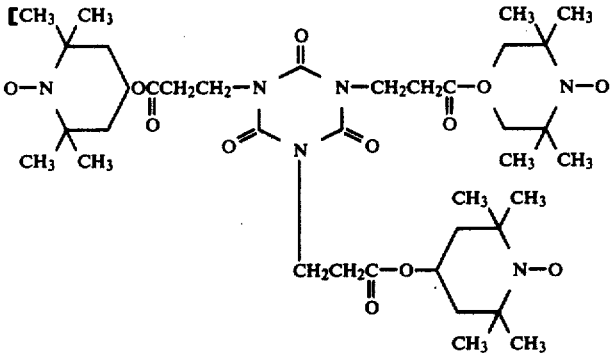
] 15
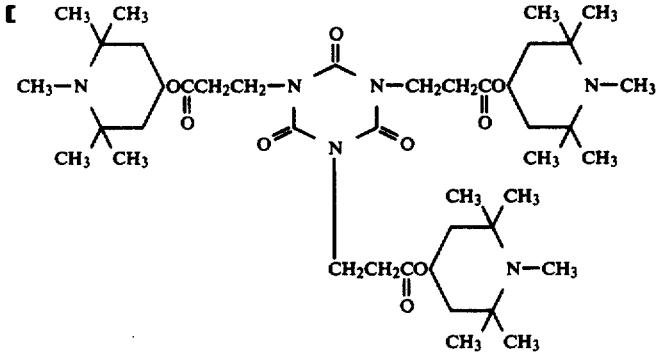
] [16] *12*
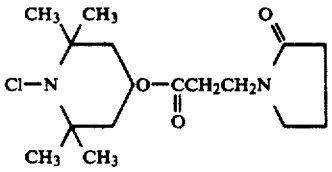
[17] *13*
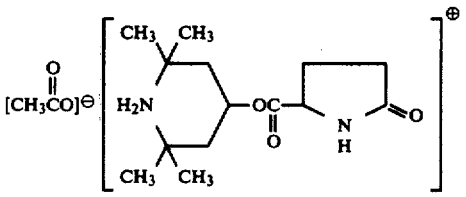
[18] *14*
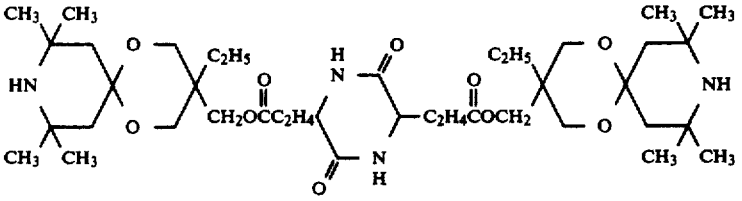

-continued

[ 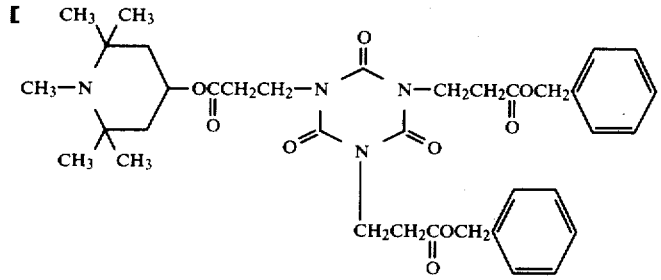 19 ]

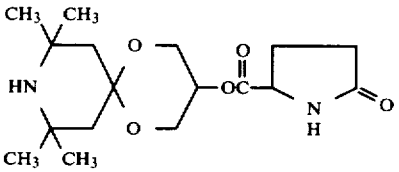

[20] *15*

The compounds in accordance with the invention are readily prepared using conventional procedures. The starting materials are either available or readily synthesized without difficulty. The corresponding 2,2,6,6-tetrasubstituted-4-hydroxy piperidine is used as a starting material for the 2,2,6,6-tetrasubstituted-4-piperidyl group $R_1$. This is reacted in the presence of an organic solvent and an alkali metal alkoxide with the carboxylic acid group of the corresponding heterocyclic ring compound containing one or more carboxylic acid groups. The hydroxy group of the piperidine becomes [esterfied] *esterified* with the carboxylic acid group of the heterocyclic ring compound, forming the 4-piperidinyl carboxylic acid ester heterocyclic compound of the invention:

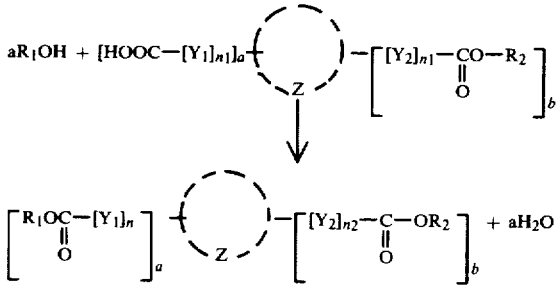

EXAMPLE I

Preparation of

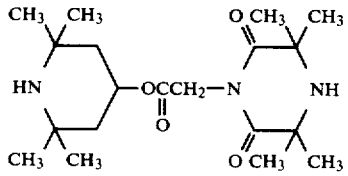

3,3,5,5-Tetramethyl-2,6-diketo piperazine, 17 g, 6 g potassium hydroxide and 70 ml of methanol were blended at room temperature, and stirred vigorously at room temperaure until reaction was complete. The methanol was then distilled off, recovering a white powder. This powder was dissolved in 100 ml of dimethylformamide and then 11 g of methylmonochloracetate was added, and the resulting reaction mixture was stirred for four hours at 80° C. the reaction mixture was cooled, and ether was then added, after which the solution was washed with water, dried, and the ether solvent removed by distillation. Ten grams of a white powder was recovered.

The powder was mixed with 6.5 g of 2,2,6,6 -tetramethyl-4-hydroxy piperidine, 100 ml of xylene and 2 g of a 12.5% methanol solution of sodium methoxide. The resulting mixture was stirred for five hours under reflux. Then methanol and xylene were distilled off, and stirring and heating continued under reflux for five additional hours. The reaction mixture was cooled. 200 ml of benzene was added and the resulting solution washed with water, dried, and the benzene removed by distillation.

A viscous liquid was obtained, which was washed with ethyl alcohol, after which a white powder was recovered. The powder had the following analysis:

| | C | H | N |
|---|---|---|---|
| Found | 61.28 | 9.17 | 11.84 |
| Calculated for formula above | 60.99 | 9.10 | 11.86 |

This demonstrated that the compound had the formula shown above. [EXAMPLE II]

[Preparation of]

[ 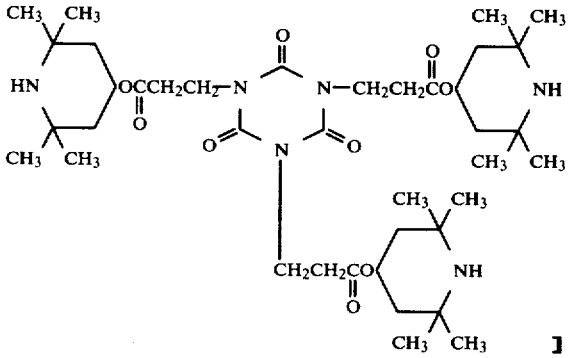 ]

[Tris-(methoxy carbonyl ethyl) isocyanurate 39 g; 2,2,6,6-tetramethyl-4-hydroxy-piperidine, 50 g, 300 g of xylene and 5 g of a 12.5% methanol solution of sodium methoxide was blended and stirred for five hours under reflux. The solvents were then distilled off, and stirring continued for an additional five hours, under reflux. After cooling, 200 ml of benzene was added, and the resulting solution was washed with water, dried, and the benzene solvent removed by distillation. A viscous liquid was obtained. This was washed with methanol, whereupon 48 g of a white powder was obtained.]

[This powder had the following analysis:]

| [ | C | H | N |
|---|---|---|---|
| Found | 61.56 | 8.80 | 10.79 |
| Calculated for formula above | 61.39 | 8.72 | 11.01] |

[This demonstrated that the compound had the formula shown above.]

The 2,2,6,6-tetrasubstituted-4-piperidyl carboxylic acid ester heterocyclic compounds of the invention are effective stabilizers to enhance the resistance to deterioration due to heat and/or light of synthetic polymeric materials which are susceptible to such degradation, including polyolefins such as low density polyethylene, high density polyethylene, polypropylene, polybutylene, polyisobutylene, polypentylene, and polyisopentylene, polystyrene; polydienes, such as polybutadiene and polyisoprene; and copolymers of olefins and dienes with other ethylenically and acetylenically unsaturated monomers, such as ethylene-propylene copolymers, ethylene-butene copolymers, ethylene-pentene copolymers, ethylene-vinyl acetate copolymers, styrene-butadiene copolymers, acrylonitrile-styrene-butadiene copolymers, synthetic rubbers of all types, such as polychloroprene; polyvinyl halides, including polyvinyl chloride homopolymer, polyvinylidene chloride; and copolymers of vinyl chloride and vinylidene chloride; vinyl chloride and vinyl acetate; vinylidene chloride and vinyl acetate; and other ethylenically unsaturated monomers; polyacetals such as polyoxymethylene and polyoxyethylene; polyesters such as polyethylene glycol-terephthalic acid ester polymers; polyamides such as polyepsiloncaprolactam; polyhexamethylene adipamide and polydecamethylene adipamide; polyurethanes; and epoxy resins.

The synthetic polymer can be in any physical form, including (for example) filaments, yarns, films, sheets, molded articles, latex, and foam.

The stabilizers of the invention can be employed as the sole stabilizer or, preferably, in combination with other conventional heat and light stabilizers for the particular synthetic polymer.

Thus, for example, in the case of polyvinyl chloride resins, other polyvinyl chloride resin heat stabilizers can be included, including polyvalent metal fatty acid salts such as barium and cadmium salts of the higher fatty acids; organic triphosphites; organotin compounds; hindered phenols; and epoxy compounds.

With polyolefin resins there can be employed fatty acid salts of polyvalent metals, organic phosphites, phenolic antioxidants, and the higher fatty acid esters of thiodipropionic acids, such as, for example, dilauryl thiodipropionate.

With polyamide resin compositions, polyamide stabilizers such as copper salts in combination with iodides and/or phosphorus compounds and salts of divalent manganese can be used.

With synthetic rubbers and acrylonitrile butadiene styrene terpolymers, antioxidants such as hindered phenols and bis-phenols, polyvalent metal salts of the higher fatty acids, and organic phosphites can be used.

In addition, other conventional additives for synthetic polymers, such as plasticizers, lubricants, emulsifiers, antistatic agents, flameproofing agents, pigments and [filters,] *fillers* can be employed.

The following Examples in the opinion of the inventors represent preferred embodiments of synthetic resin compositions in accordance with the invention.

EXAMPLES 1 to [4] *3*

A group of five polyvinyl chloride resin compositions was prepared having the following formulation:

| Ingredient | Parts by Weight |
|---|---|
| Polyvinyl chloride | 100 |
| Dioctylphthalate | 50 |
| Ca stearate | 1.0 |
| Zn stearate | 0.1 |
| Stabilizer as shown in Table I | 0.1 |

This formulation was blended and sheeted off on a two roll mill to form sheets 1 mm thick. The light resistance of these sheets was then determined by placing strips 1 cm long in a Weather-O-Meter, and exposing them to ultraviolet light. The time in hours was then noted for the sheet to develop a noticeable discoloration and/or embrittlement, indicating deterioration due to oxidation in the presence of ultraviolet light.

This test was repeated for a total of five stabilizers, four in accordance with the invention, having the formulae indicated in Table I. The following results were obtained:

TABLE I

| Example No. | Stabilizer | Hours to Failure |
|---|---|---|
| Control | 2-hydroxy-4-methoxybenzophenone | 380 |
| 1 | 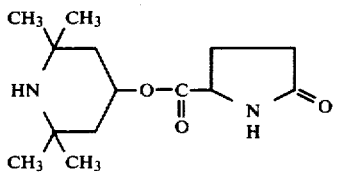 | 630 |

TABLE I-continued

| Example No. | Stabilizer | Hours to Failure |
|---|---|---|
| 2 | 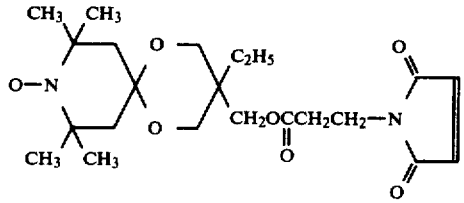 | 720 |
| 3 | 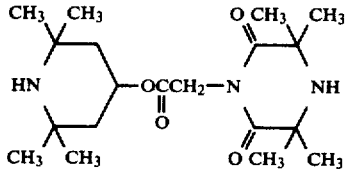 | 600 |
| [4] | 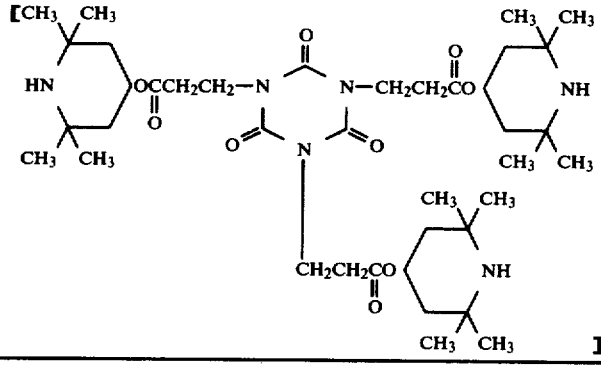 | [850] |

It is apparent that each of the four stabilizers in accordance with the invention is far superior to the control, a conventional ultraviolet light stabilizer for polyvinyl chloride, 2-hydroxy-4-methoxy-benzophenone.

EXAMPLES [5 to 12] *4 to 8*

Ten polypropylene compositions were prepared using eight stabilizers of the invention and two of the prior art, and having the following formulation:

| Ingredient | Parts by Weight |
|---|---|
| Polypropylene | 100 |
| Distearylthiodipropionate | 0.3 |
| Goodrite 3114 | |

-continued

| Ingredient | Parts by Weight |
|---|---|
| (1,3,5-tris-(3',5'-di-t-butyl 4'-hydroxybenzyl)isocyanurate) | 0.1 |
| Stabilizer as shown in Table II | 0.3 |

The composition was thoroughly blended in a Brabender Plastograph, and then compression-molded to form sheets 0.5 mm thick. Pieces 3 cm square were cut off from the sheets and exposed to ultraviolet light in a Weather-O-Meter. The time in hours required for the sheet to develop a noticeable dicoloration and/or embrittlement was noted as the hours to failure. The results obtained are shown in Table II.

TABLE II

| Example No. | Stabilizer | Hours to Failure |
|---|---|---|
| Control A | Tinuvin-P(2-(2'-hydroxy-5'-methylphenyl)benzotriazole) | 300 |
| Control B | 2-hydroxy-4-octoxybenzophenone | 240 |
| 4[5] | 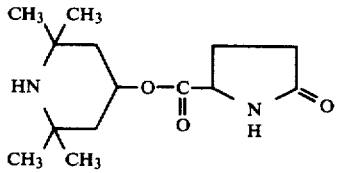 | 740 |

TABLE II-continued
| Example No. | Stabilizer | Hours to Failure |
|---|---|---|
| 5[6] | 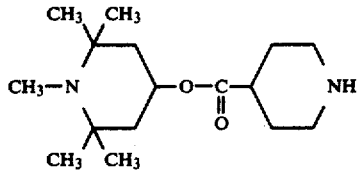 | 780 |
| 6[7] | 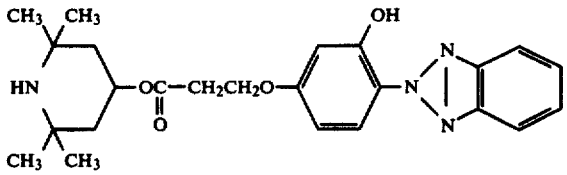 | 790 |
| 7[8] | 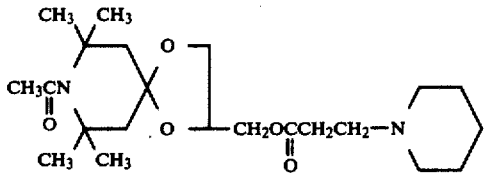 | 720 |
| 8[9] | 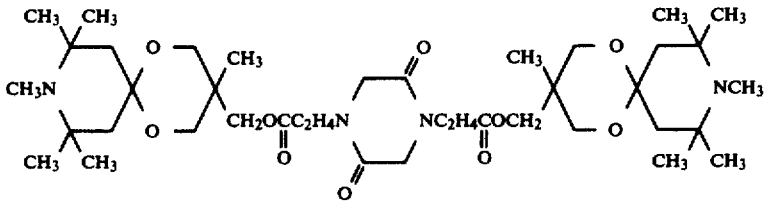 | 700 |
| [10] | 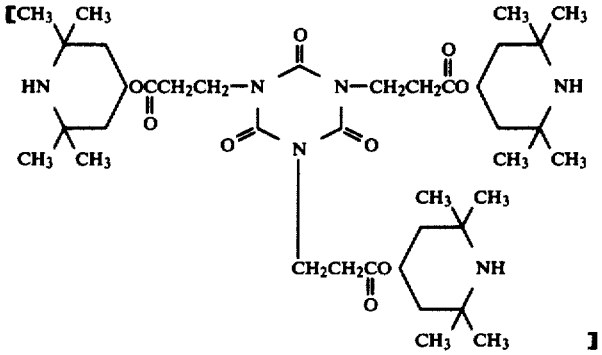 | [820] |
| [11] | 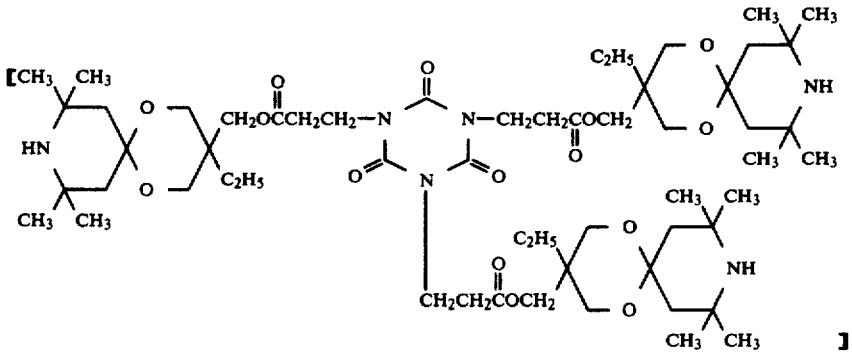 | [710] |

TABLE II-continued

| Example No. | Stabilizer | Hours to Failure |
|---|---|---|
| [12] | 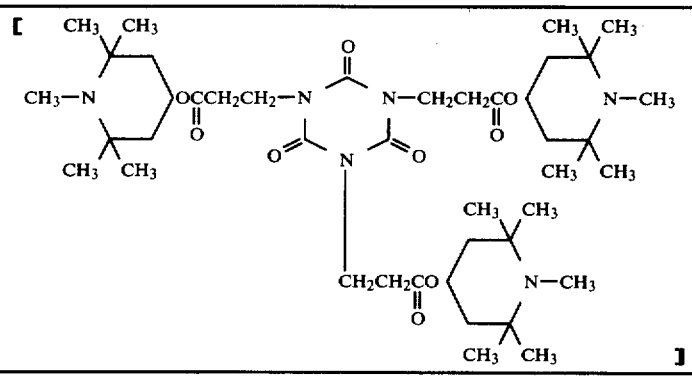 | [760] |

It is apparent from the above results that the compounds of the invention are superior stabilizers in enhancing the resistance of the polypropylne polymer composition to deterioration in the presence of ultraviolet light.

EXAMPLES [13 to 17] *9 to 13*

Six ethylene-vinyl acetate copolymer compositions were prepared using five stabilizers of the invention and one of the prior art, and having the following formulation:

| Ingredient | Parts by Weight |
|---|---|
| Ethylene-vinylacetate copolymer | 100 |
| Stabilizer as shown in Table III | 0.2 |

The stabilizer was blended with the polymer on a two-roll mill at 120° C., and sheets 1 mm thick were then compression molded at 120° C. from the resulting blend. Pieces 3 mm square were cut off from the sheets and exposed to ultraviolet light in a Weather-O-Meter for 500 hours. At the start and at the conclusion of the test, the tensile strength of the sheet samples was determined. The results are given in Table III as % retention of the initially determined tensile strength:

TABLE III

| Example No. | Stabilizer | % Retention of Tensile Strength After 500 Hours |
|---|---|---|
| Control B | 2-hydroxy-4-octoxybenzophenone | 75 |
| *9*[13] | 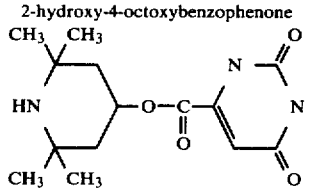 | 86 |
| *10*[14] | 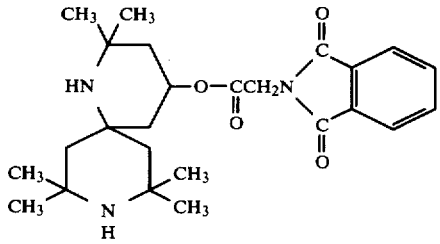 | 80 |
| *11*[15] | 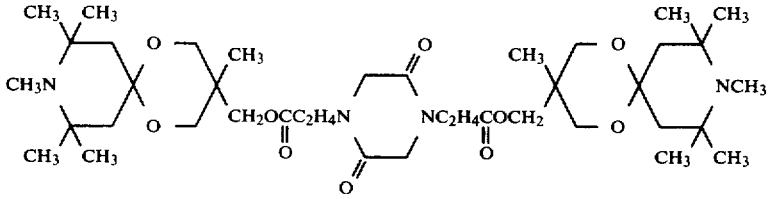 | 85 |

TABLE III-continued

| Example No. | Stabilizer | % Retention of Tensile Strength After 500 Hours |
|---|---|---|
| *12*[16] | 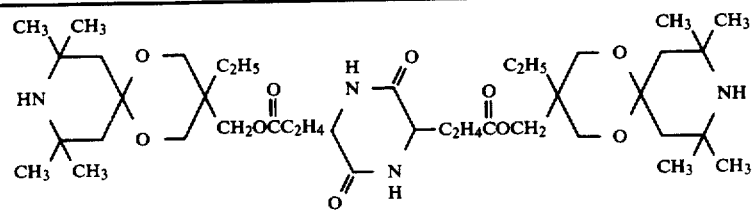 | 83 |
| *13*[17] | 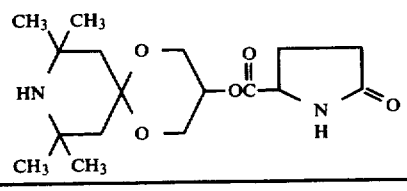 | 87 |

25

It is apparent from the results that the stabilizer compositions in accordance with the invention are superior to 2-hydroxy-4-octoxybenzophenone in enhancing the resistance of the ethylene-vinyl acetate copolymer to deterioration in the presence of ultraviolet light.

EXAMPLES [18 to 22] *14 to 16*

Seven high density polyethylene compositions were prepared using five stabilizers of the invention and two of the prior art, and having the following formulation:

| Ingredient | Parts by Weight |
|---|---|
| High-density polyethylene | 100 |
| Stabilizer as shown in Table IV | 0.1 |

The stabilizer was blended with the polymer on a two roll mill and sheets 0.5 mm thick were prepared by compression molding of the blend. Pieces 2 cm square were cut off from the sheets, and exposed in a Weather-O-Meter to ultraviolet light. The time in hours when degradation set in, as determined by a significant discoloration and/or embrittlement, was noted as hours to failure and the results are reported in Table IV:

TABLE IV

| Example No. | Stabilizer | Hours to Failure |
|---|---|---|
| Control A | 2-hydroxy-4-octoxybenzophenone | 530 |
| Control B | Tinuvin-P(2-(2'-hydroxy-5'-methylphenyl)benzotriazole) | 580 |
| *14*[18] | 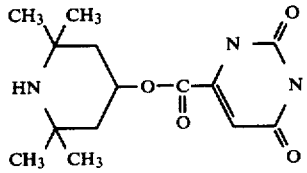 | 1030 |
| *15*[19] | 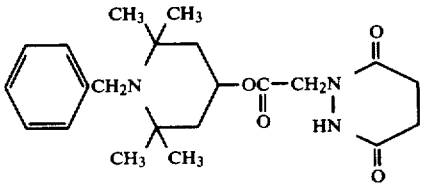 | 970 |

TABLE IV-continued

| Example No. | Stabilizer | Hours to Failure |
|---|---|---|
| [20] | 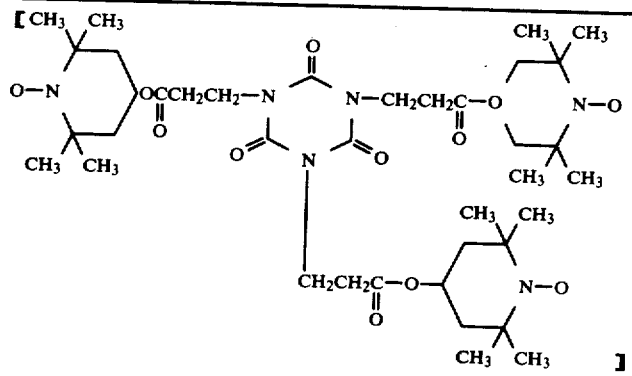 | [1140] |
| 16[21] | 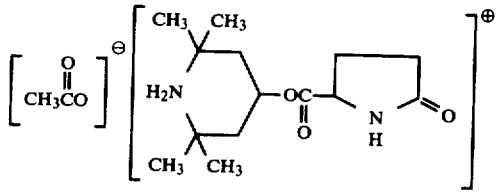 | 1006 |
| [22] | 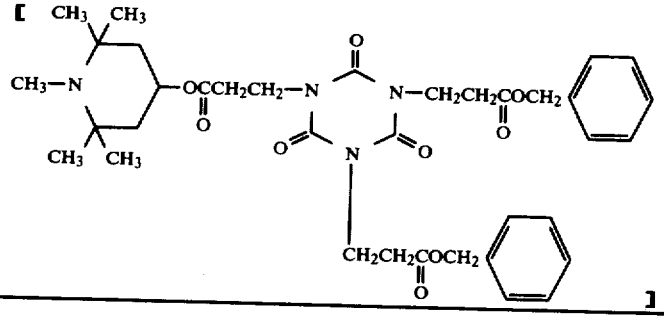 | [1180] |

The stabilizers of the invention are clearly superior to the controls in enhancing resistance of the polyethylene to degradation under ultraviolet light.

EXAMPLES [23 to 26] *17 to 20*

Five acrylonitrile-butadiene-styrene terpolymer resin compositions were prepared using four stabilizers of the invention and one of the prior art, and having the following formulation:

| Ingredient | Parts by Weight |
|---|---|
| Acrylonitrile-butadiene-styrene terpolymer [S] | 100 |

-continued

| Ingredient | Parts by Weight |
|---|---|
| Stabilizer as shown in Table V | 0.1 |

The stabilizer was blended with the resin on a two roll mill, and sheets 3 mm thick were prepared by compression molding of the resulting blend. Pieces 3 cm square were cut off from the sheets, and subjected to ultraviolet light in a Weather-O-Meter for 800 hours. Tensile strength before and after the test exposure was determined, and the results reported as the percent of tensile strength retained, at the end of this time, in Table V.

TABLE V

| Example No. | Stabilizer | % Tensile Strength Retained |
|---|---|---|
| Control | 2,2'-dihydroxy-4-octoxybenzophenone | 72 |
| 17[23] | 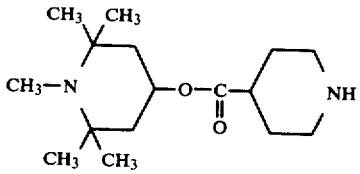 | 93 |

TABLE V-continued

| Example No. | Stabilizer | % Tensile Strength Retained |
|---|---|---|
| 18[24] | 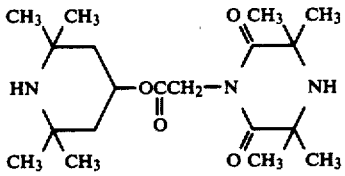 | 91 |
| 19[25] | [ 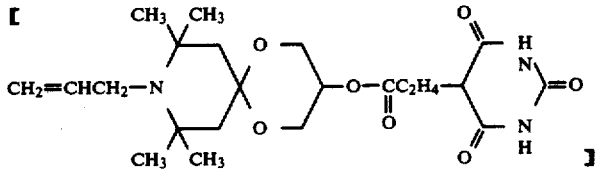 ] | 92 |
| | 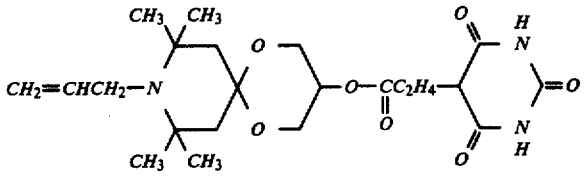 | |
| 20[26] | 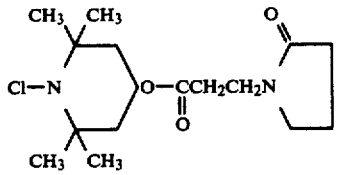 | 89 |

It is apparent from the data that the stabilizers of the invention are superior to the 2,2'-dihydroxy-4-octoxybenzophenone of the prior art.

[EXAMPLES 27 to 29] *EXAMPLE 21*

Four polyamide resin compositions were prepared using three stabilizers of the invention, and having the following formulation:

| Ingredient | Parts by Weight |
|---|---|
| Poly-epsilon-caprolactam | 100 |

-continued

| Ingredient | Parts by Weight |
|---|---|
| Stabilizer as shown in Table VI | 0.1 |

The stabilizer was blended with the finely powdered poly-epsiloncaprolactam in a ball mill for fifteen minutes, and the resulting powder was then compression-molded at 250° C. to form sheets 0.5 mm thick. Pieces 2 cm square were cut off from the sheets, and exposed to ultraviolet light in a Weather-O-Meter for 120 hours. At the conclusion of the test period, the color of the sheets was noted. The results are given in Table VI.

TABLE VI

| Example No. | Stabilizer | Color of Sheet |
|---|---|---|
| Control | None | Yellow |
| 21 | 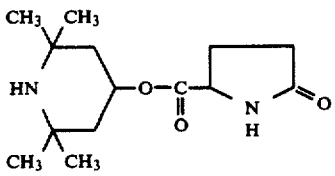 | None |

TABLE VI-continued

| Example No. | Stabilizer | Color of Sheet |
|---|---|---|
| | [ 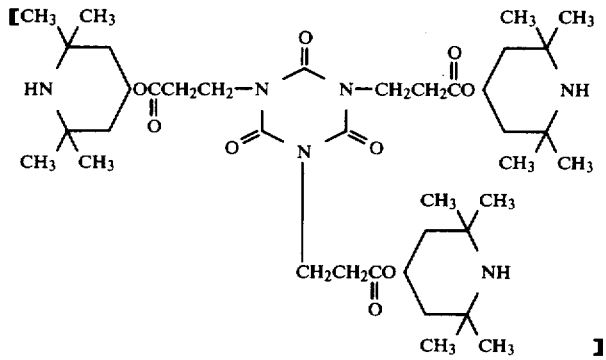 ] | [None] |
| | [ 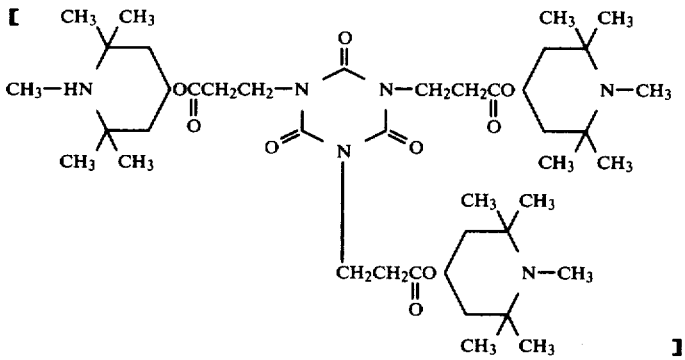 ] | [None] |

It is apparent that the stabilizers of the invention are effective ultraviolet light stabilizers for polyamide resins.

Having regard to the foregoing disclosures, the following is claimed as the inventive and patentable embodiments thereof:

1. A 2,2,6,6-tetrasubstituted-4-piperidyl carboxy heterocyclic compound having the general formula:

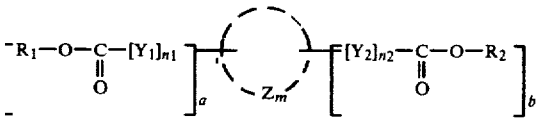

I wherein:

$R_1$ is selected from the group consisting of

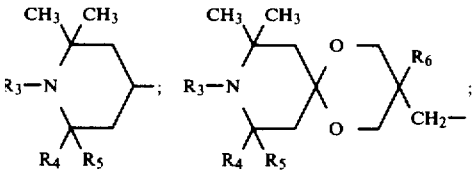

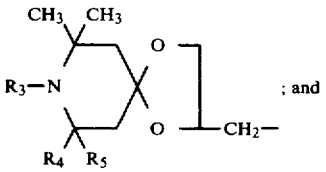

; and

-continued

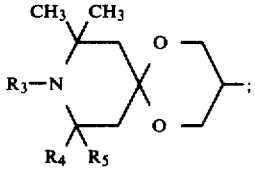

$R_2$ is selected from the group consisting of hydrogen; alkyl; alkenyl; alkynyl; aralkyl; aryl;

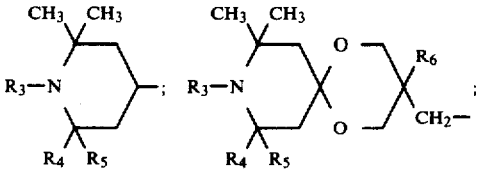

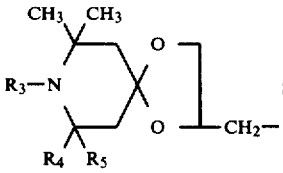

; and

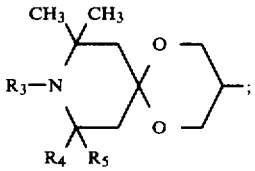

$R_3$ is selected from the group consisting of hydrogen; oxo; halogen; alkyl; alkenyl; alkynyl; aralkyl and aryl;

$R_4$ and $R_5$ are selected from the group consisting of alkyl and $R_4$ and $R_5$ taken together to form

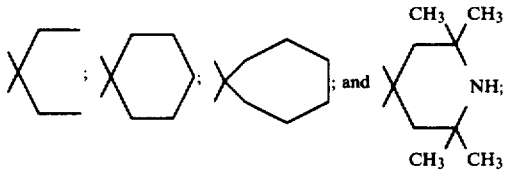

$R_6$ is lower alkyl;

a is selected from the group consisting of 1, 2 and 3;

b is selected from the group consisting of 0, 1 and 2;

Z represents a heterocyclic ring having from three to six ring atoms of which one to [three aee] *two are* nitrogen, any remaining ring atoms being carbon atoms;

m is selected from the group consisting of 1, 2 and 3;

$Y_1$ and $Y_2$ are bivalent linking groups selected from the group consisting of alkylene and alkyleneoxyarylene, the alkylene having from one to four carbon atoms; and $n_1$ and $n_2$ are 0 or 1.

2. A compound according to claim 1 in which $n_1$ and $n_2$ are each zero.

3. A compound according to claim 1 in which a is 1 and b is zero.

4. A compound according to claim 1 in which a is 1 and b is 1.

5. A compound according to claim 1 in which $n_1$ and $n_2$ are each 1 and $Y_1$ and $Y_2$ are each alkylene.

6. A compound according to claim 5 in which $Y_1$ and $Y_2$ are each $CH_2$.

7. A compound according to claim 6 in which $Y_1$ and $Y_2$ are each $C_2H_4$.

8. A compound according to claim 1 in which $R_1$ is

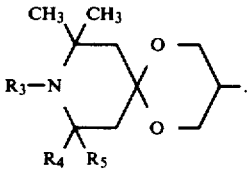

9. A compound according to claim 1 in which $R_1$ is

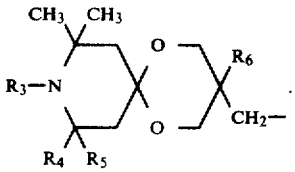

10. A compound according to claim 1 in which $R_1$ is

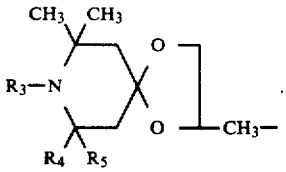

11. A compound according to claim 1 in which $R_1$ is

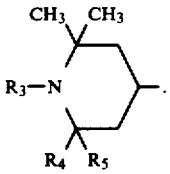

12. A compound according to claim 1 in which

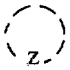

is a pyrrolidine ring.

13. A compound according to claim 1 in which

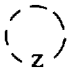

is a pyrazolidine ring.

14. A compound according to claim 1 in which

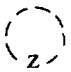

is a piperidine ring.

15. A compound according to claim 1 in which

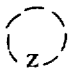

is a piperazine ring.

[16. A compound according to claim 1 in which ]

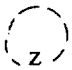

[is a triazine ring.]

[17. A compound according to claim 1 having formula: ]

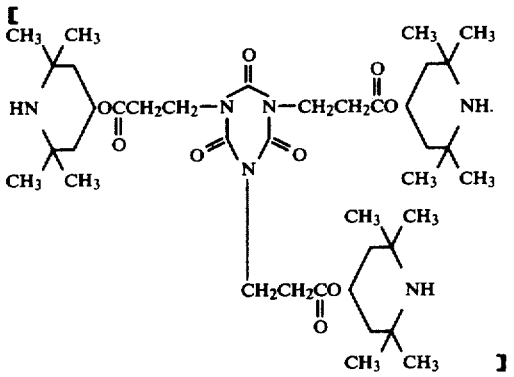

18. A compound according to claim 1 having the formula:

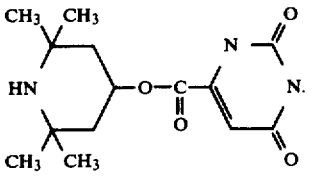

[19. A compound according to claim 1 having the formula: ]

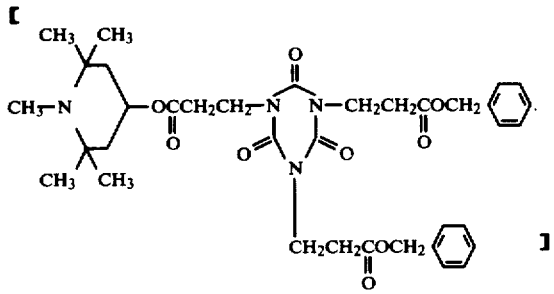

20. A compound according to claim 1 having the formula:

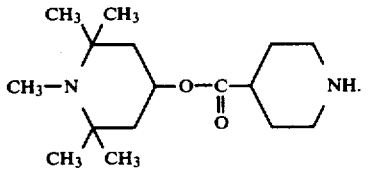

21. A polyvinyl chloride resin composition having improved resistance to deterioration when heated at 350° F., comprising a polyvinyl chloride resin formed at least in part of the recurring group

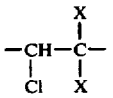

and having a chlorine content in excess of 40 percent, where X is either hydrogen or chlorine; and an amount to improve resistance to deterioration of the resin of a compound in accordance with claim 1.

22. A polyvinyl chloride resin composition in accordance with claim 21, in which the polyvinyl chloride resin is polyvinyl chloride homopolymer.

23. A polyvinyl chloride resin composition in accordance with claim 21, in which the polyvinyl chloride resin is a copolymer of vinyl chloride and vinyl acetate.

24. An olefin polymer composition having improved resistance to deterioration comprising an olefin polymer selected from the group consisting of polymers of alpha-olefins having from two to six carbon atoms and polystyrene, and an amount [of] *to* improve resistance to deterioration of the resin of a compound in accordance with claim 1.

25. An olefin polymer composition in accordance with claim 24 wherein the polyolefin is polypropylene.

26. An olefin polymer composition in accordance with claim 24 wherein the polyolefin is polyethylene.

27. An acrylonitrile-butadiene-styrene polymer having improved resistance to deterioration when heated at 300° F. and above and an amount to improve resistance to deterioration of the resin of a compound in accordance with claim 1.

28. A synthetic rubbery diene polymer composition having improved resistance to deterioration comprising a rubbery diene polymer and an amount to improve resistance to deterioration of the resin of a compound in accordance with claim 1.

29. A polyamide resin composition having improved resistance to deterioration comprising a polyamide resin and an amount to improve resistance to deterioration of the resin of a compound in accordance with claim 1.

30. An ethylene-vinyl acetate copolymer composition having improved resistance to deterioration comprising an ethylene-vinyl acetate copolymer and an amount to improve resistance to deterioration of the resin of a compound in accordance with claim 1.

*31. A compound according to claim 1 in which*

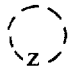

*is a pyrrole ring.*

*32. A compound according to claim 1 in which*

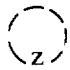

*is a pyrrole ring.*

*33. A compound according to claim 1 in which*

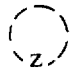

*is a pyrimidine.*

*34. A compound according to claim 1 in which*

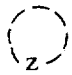

*is a pyridazine ring.*

* * * * *